United States Patent
Takaoka

[11] Patent Number: 6,060,098
[45] Date of Patent: May 9, 2000

[54] CEREAL CAKE AND MANUFACTURING METHOD

[76] Inventor: Terumi Takaoka, 2225-1 Oazanorinouchiko, Kawauchi-cho, Onsen-gun, Ehime, Japan

[21] Appl. No.: 09/149,185

[22] Filed: Sep. 8, 1998

[51] Int. Cl.$^7$ ...................................................... A23L 1/025
[52] U.S. Cl. ........................ 426/237; 426/241; 426/242; 426/453; 426/459; 426/462; 426/465; 426/468; 426/285
[58] Field of Search ..................................... 426/285, 272, 426/274, 453, 465, 468, 237, 241, 242, 459, 462, 507

[56] References Cited

U.S. PATENT DOCUMENTS 5,738,892  4/1998  Takaoka ................................... 426/242

FOREIGN PATENT DOCUMENTS 63-267247  11/1988  Japan .
1-285165   11/1989  Japan .
409163941   6/1997  Japan .

*Primary Examiner*—Milton Cano
*Attorney, Agent, or Firm*—Moonray Kojima

[57] ABSTRACT

The invention provides a cereal cake formed by using germinated brown rice or other germinated cereal irradiated with far infrared rays as the material, and its manufacturing method, and more particularly it relates to cereal cake and its manufacturing method characterized by heating and pressing germinated cereal irradiated with far infrared rays, not a mere cereal, to process into a specified form, and therefore by germination of the cereal, phosphorus is supplied, phosphate enzyme acts, phytic acid is decomposed into phosphoric acid and inositol, protein is bonded to amino acid, fat to essential fatty acid, starch to sugar and minerals to amino acid, so as to be absorbed smoothly in the body, zinc, other minerals and vitamins are increased several times, and in particular the starch is transformed into sugar, so that a natural sweetness is provided without any particular sweetening process.

8 Claims, 2 Drawing Sheets

CEREAL CAKE AND MANUFACTURING METHOD

BACKGROUND OF THE INVENTION

1. Field of the Invention

The present invention relates to a cereal cake formed by using germinated brown rice or other germinated cereals as material, and its manufacturing method.

2. Description of the Prior Art

The conventional cereal cake was made by using cereals, such as brown rice, milled rice, barnyard millet and millet, as the material, charging the cereals into a forming section of a so-called rice cake machine, pressing by upper pattern and lower pattern, heating, and processing into a disk form of about 4.5 to 10.5 cm in diameter and about 5 to 10 mm in thickness.

In this conventional cereal cake, since the material cereals such as brown rice, milled rice, barnyard millet and millet contain protein, fat, starch, and minerals (general name of four major elements of sodium, potassium, calcium and magnesium, with essential trace minerals such as iron, zinc, copper, iodine, chromium, cobalt, manganese, and others), it is known to be good for health, but when the cereal is used directly as the material without any processing, digestion of protein and absorption of minerals are impeded by phytic acid which is a kind of acid contained in the cereal (by bonding of phosphorus and inositol), and if directly taken, the cereal is not absorbed in the body but is excreted, and if too much phytic acid (myo-inositol hexaphosphoric acid) is taken, absorption of calcium, magnesium, iron, or zinc in one's one intestines is impeded, and nutritional disorder may be caused.

In addition, in such conventional cereal cake, since it is almost tasteless, sweetening process by adding sugar and seasoning was required. Yet, since it is as thick as about 5 to 10 mm, it was hard to bite for children and elderly people.

SUMMARY OF THE INVENTION

It is hence an object of the invention to present a manufacturing method of cereal cake by heating and pressing germinated cereal, not a mere cereal, to process into a specified form, and therefore by germination of the cereal, phosphorus is supplied, phosphate enzyme acts, phytic acid is decomposed into phosphoric acid and inositol, protein is bonded to amino acid, fat to essential fatty acid, starch to sugar and minerals to amino acid, so as to be absorbed smoothly in the body, zinc, other minerals and vitamins are increased several times, and in particular the starch is transformed into sugar, so that a natural sweetness is provided without any particular sweetening process.

It is other object of the invention to present a manufacturing method of cereal cake by heating and pressing germinated cereal irradiated with far infrared rays to process into a specified thin form, and therefore the nutriment of the cereal is extracted to the maximum extent by far infrared activity so as to be absorbed sufficiently in the body, and by processing into a specified thin form, it can be taken easily by children and elderly people, and the touch to the tongue is smooth, and it can be presented as gruel when put in boiling water.

It is a different object of the invention to present a manufacturing method of cereal cake by using, as the germinated cereal, germinated brown rice, germinated husked wheat, germinated husked barley, germinated soybean, or germinated corn seed, and therefore the nutriment of the cereal is extracted to the maximum extent to be absorbed smoothly in the body.

It is other different object of the invention to present a manufacturing method of cereal cake by adding at least one additive food out of black soybean, black sesame, hijiki and small fish to the germinated cereal, and therefore the nutriment and flavor of such additive food can be added.

It is still other different object of the invention to present a cereal cake capable of achieving the above objects by heating and pressing the germinated cereal to process into the cereal cake having a specified form.

Further objects of the invention will be better understood from the following detailed description of the embodiment.

DESCRIPTION OF THE PREFERRED EMBODIMENT

Figure 1:
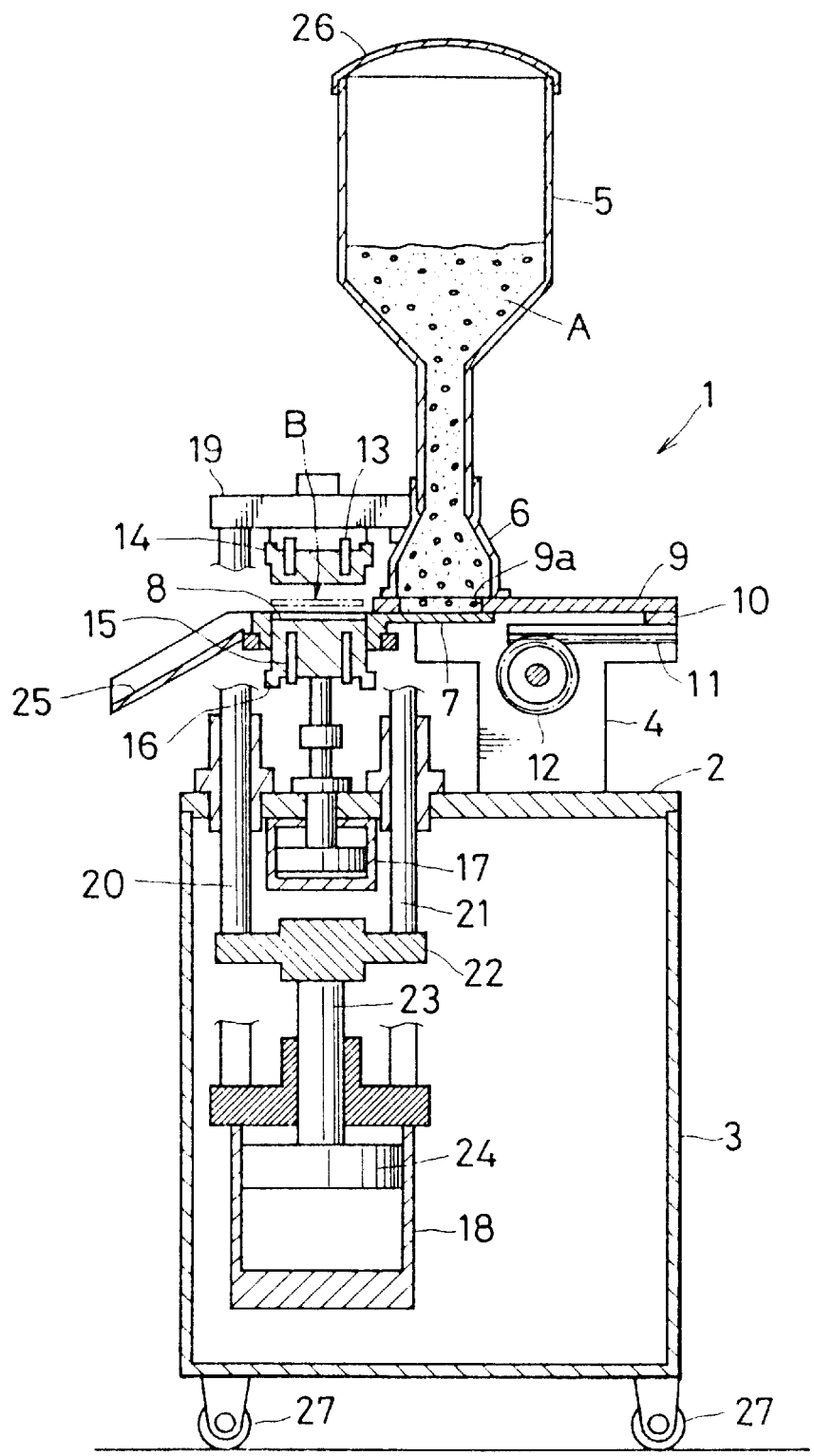
FIG. 1 is a sectional view of a manufacturing apparatus used in the manufacturing method of cereal cake of the invention.

An embodiment of the invention is described below while referring to the drawings.

The drawings show the cereal cake and its manufacturing method, and first referring to FIG. 1, the constitution of a manufacturing apparatus used in the manufacturing method of cereal cake of is described.

This manufacturing apparatus 1 has a box 3 provided with a base member 2 in the upper part, and a hopper 5 and a feed tube 6 are attached to the base member 2 through a frame 4.

Between the lower side of the feed tube 6 and the upper side of a guide block 7, a feed plate 9 is provided so as to be movable horizontally back and forth as feed means for receiving the germinated cereal A at its opening 9a, and feeding the terminated cereal A into a processing recess 8.

The feed plate 9 is fitted to a rack 11 through a coupling member 10, and is designed to reciprocate horizontally by rotation of a pinion 12 which is driven normally and reversely by a motor (not shown).

On the other hand, above and beneath the processing recess 8, an upper pattern 14 having a heater 13, and a lower pattern 16 having a h eater 15 are disposed oppositely, and the lower pattern 16 having ejecting function is driven by a lower pattern cylinder 17 provided at the lower side of the base member 2, whereas the upper pattern 14 is driven by an upper pattern cylinder 18 provided in the box 3.

Herein, the upper pattern 14 is attached to an upper pattern plate 19, and this upper pattern plate 19 is coupled to a piston 24 in an upper cylinder 18 through tie rods 20, 21, a junction plate 22, and a piston rod 23.

Figure 2:
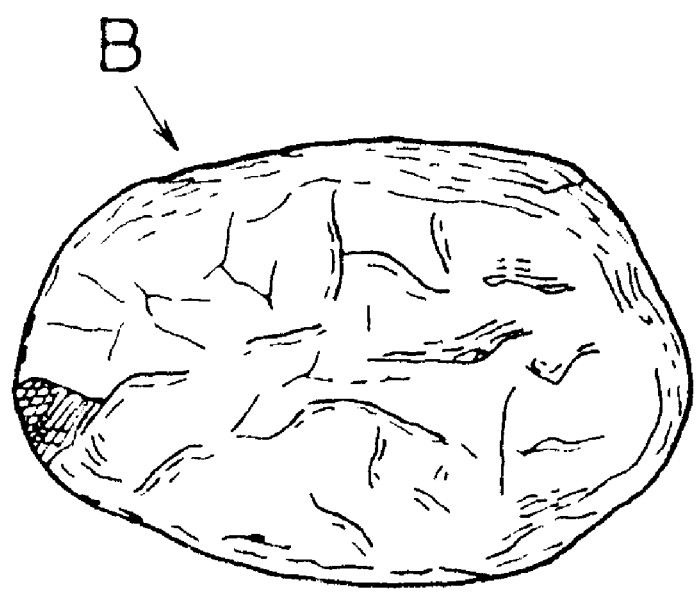
FIG. 2 is a perspective view of a manufactured cereal cake.

Further, at the anti-feed plate side (left side in the drawing) of the processing recess 8, a chute 25 for guiding discharge of the manufactured cereal cake B (see FIG. 2) is provided in an inclined state. In the drawing, reference numeral 26 is a detachable lid for covering the upper end opening of the hopper 5, and 27 is a caster.

To manufacture the cereal cake B by using thus constituted manufacturing apparatus 1, the germinated cereal A (for example, germinated brown rice) as the material is preliminarily processed by far infrared treatment. That is, the germinated cereal A is dried at low temperature around 30 deg. C., and is uniformly irradiated with far infrared rays to dry thoroughly into the inner parts, and the nutriment of the cereal is extracted to the best state by the far infrared activity so as to be processed to be absorbed sufficiently in the body.

The germinated cereal A processed by far infrared treatment alone, or the mixture of this germinated cereal A and at least one additive food out of black soybean (including germinated black soybean), black sesame, seaweed and small fish ground to a same size as rice grain is charged into the hopper 5. In this case, since the germinated cereal A (in particular, germinated rice) has a water content of about 14.5 to 17.5%, particular soaking treatment is not necessary.

Consequently, the germinated cereal A, or its mixture with additive food (that is, the material) supplied into the opening 9a of the feed plate 9 from the feed tub 6 communicating with the hopper 5 is supplied into the processing recess 8 by the forward drive of the feed plate 9.

After moving back the feed plate 9, in the processing recess 8, the upper pattern 14 is pressed against the lower pattern 16 with the material placed between them, and the heaters 13, 15 are energized to heat (bake) the material for about 10 seconds at temperature of about 200 to 280 deg. C., preferably about 240 deg. C.

Then the upper pattern 14 is put aside upward, and the lower pattern 16 is utilized as the eject member, and the cereal cake B molded into a thin form of about 1 to 2 mm in thickness and about 4.5 cm in diameter is taken out from the processing recess 8, and the baked cereal cake B is discharged from the chute 25 by effectively utilizing the feed after of next material of the feed plate 9.

Incidentally, the thickness and diameter of the cereal cake B are only examples, and, for instance, the cereal cake B may be formed in a diameter of about 1 cm like corn flakes.

Thus, according to the cereal cake and its manufacturing method of the embodiment, since the cereal cake B is manufactured by heating and pressing the germinated cereal A to process into a specified form, phosphorus is supplied by germination of cereal, phosphate enzyme acts, phytic acid is decomposed into phosphoric acid and inositol, protein is bonded to amino acid, fat to essential fatty acid, starch to sugar and minerals to amino acid, so as to be absorbed smoothly in the body, zinc, other minerals and vitamins are increased several times, and in particular the starch is transformed into sugar, so that the cereal cake B having a natural sweetness can be manufactured without any particular sweetening process, and it is also ideal as the elderly people's food, snack, or side dish.

Moreover, since the germinated cereal A irradiated with far infrared rays is heated and pressed into a specified thin form (for example, a thickness of about 1 to 2 mm), in addition to the above effects, the nutriment of the cereal is extracted to the best state by the effect of far infrared activity so as to be absorbed sufficiently in the body, and also by processing into a specified thin form, it is taken easily not only by the ordinary people, but also by children and elderly people, and it is smooth to the tongue, or by pouring boiling water over it, it becomes gruel in about 30 to 60 seconds to be presented as gruel, so that it may be appropriate as the weaning diet or postoperative diet.

Besides, by using, as the germinated cereal, germinated brown rice, germinated wheat, germinated barley, germinated soybean, or germinated corn seed, the nutriment of the cereal is extracted to the maximum extent, so that the cereal cake to be absorbed smoothly in the body is manufactured.

Still more, by adding at least one additive food out of black soybean (including germinated black soybean), black sesame, hijiki, seaweed and small fish to the germinated cereal A, the nutriment and flavor of such additive food can be added to the natural sweetness.

What is claimed is:

1. A method of producing a cereal cake comprising the steps of:

irradiating germinated cereal with far infrared rays; and heating and pressing the irradiated germinated cereal to thereby form the cereal cake having a desired shape, wherein said germinated cereal is heated at a temperature of between 200 to 280° C., and for a period of time of about 10 seconds.

2. The method of claim 1, wherein said germinated cereal is selected from the group consisting of:

germinated brown rice;

germinated husked wheat;

germinated husked barley;

germinated soybean; and germinated corn seed.

3. The method of claim 1, further comprising the step of adding to the germinated cereal at least one additive selected from the group consisting of:

black soybean;

black sesame;

hijiki; and small fish.

4. The method of claim 3, wherein said germinated cereal is germinated brown rice; and said additive is the same size as said germinated brown rice.

5. The method of claim 1, wherein said germinated cereal is dried at a temperature of about 30° C. and the far infrared rays are irradiated uniformly to thoroughly dry the inner parts of said germinated cereal.

6. The method of claim 1, wherein said temperatures is 240° C.

7. A method of producing a cereal cake comprising the steps of:

irradiating germinated cereal with far infrared rays; and heating and pressing the irradiated germinated cereal to thereby form the cereal cake having a desired shape wherein said shape of said cereal cake has a thickness of between 1 to 2 cm, and a diameter of about 4.5 cm.

8. A method of producing a cereal cake comprising the steps of:

irradiating germinated cereal with far infrared rays; and heating and pressing the irradiated germinated cereal to thereby form the cereal cake having a desired shape;

further comprising the step of adding to the germinated cereal at least one additive selected from the group consisting of:
   black soybean;
   black sesame;
   hijiki; and
   small fish;

wherein said germinated cereal is germinated brown rice; and said additive is the same size as said germinated brown rice; and said germinated brown rice has a water content of 14.5 to 17.5%.

* * * * *